(12) United States Patent
Xia et al.

(10) Patent No.: US 9,808,876 B2
(45) Date of Patent: Nov. 7, 2017

(54) STAINLESS STEEL WELDMENT AND PAD COMBINED WELDING METHOD

(71) Applicant: CHINA NATIONAL CHEMICAL ENGINEERING THIRD CONSTRUCTION CO., LTD, Huainan, Anhui (CN)

(72) Inventors: Jiewen Xia, Anhui (CN); Qingping Huang, Anhui (CN); Jialin Chen, Anhui (CN); Yuxian Su, Anhui (CN); Wenwei Li, Anhui (CN); Liyang Pang, Anhui (CN); Yan Wu, Anhui (CN)

(73) Assignee: CHINA NATIONAL CHEMICAL ENGINEERING THIRD CONSTRUCTION CO., LTD, Huainan, Anhui (CN)

( * ) Notice: Subject to any disclaimer, the term of this patent is extended or adjusted under 35 U.S.C. 154(b) by 345 days.

(21) Appl. No.: 14/408,447

(22) PCT Filed: Sep. 3, 2013

(86) PCT No.: PCT/CN2013/082851
§ 371 (c)(1),
(2) Date: Dec. 16, 2014

(87) PCT Pub. No.: WO2014/173060
PCT Pub. Date: Oct. 30, 2014

(65) Prior Publication Data
US 2015/0144600 A1 May 28, 2015

(30) Foreign Application Priority Data

Apr. 26, 2013 (CN) .......................... 2013 1 0149268

(51) Int. Cl.
*B23K 9/035* (2006.01)
*B23K 9/167* (2006.01)
(Continued)

(52) U.S. Cl.
CPC ............ *B23K 9/035* (2013.01); *B23K 9/0352* (2013.01); *B23K 9/167* (2013.01); *B23K 31/02* (2013.01);
(Continued)

(58) Field of Classification Search
CPC .... B23K 9/035; B23K 9/0213; B23K 9/0253; B23K 9/0352; B23K 9/167; B23K 37/0408; B23K 2203/05
(Continued)

(56) References Cited

U.S. PATENT DOCUMENTS 2,331,689 A * 10/1943 Hodge .................. B23K 9/035
219/160
2,357,402 A * 9/1944 Hasse .................. B23K 9/035
269/310
(Continued)

FOREIGN PATENT DOCUMENTS

CN          102837115          12/2012
CN          102848057          1/2013
(Continued)

*Primary Examiner* — Arthur O Hall
*Assistant Examiner* — Joseph A Greenlund

(57) ABSTRACT

A stainless steel weldment and pad combined welding method includes steps of: (a) respectively processing and pairing butts of to-be-welded portions of two weldments, wherein, during pairing, inner walls of the two weldments are aligned at the same plane; the butts of the two weldments are opposed to form a V-shaped groove with an angle α; and between bottoms of the butts of the two weldments is kept a gap L of 2-4 mm; (b) providing a copper pad at the gap between the bottoms of the butts of the two weldments, wherein the copper pad closely attaches to the inner walls of the two weldments; (c) welding the V-shaped groove to form a root pass; and (d) removing the copper pad, and filling the root pass to be welded into a cover pass.

9 Claims, 1 Drawing Sheet

(51) Int. Cl.
    *B23K 31/02*     (2006.01)
    *B23K 37/04*     (2006.01)
    *B23K 9/02*     (2006.01)
    *B23K 9/025*     (2006.01)
    *B23K 103/04*     (2006.01)

(52) U.S. Cl.
    CPC ........ *B23K 37/0408* (2013.01); *B23K 9/0213* (2013.01); *B23K 9/0253* (2013.01); *B23K 2203/05* (2015.10)

(58) Field of Classification Search
    USPC .................................................. 219/75, 137 R
    See application file for complete search history.

(56) References Cited

U.S. PATENT DOCUMENTS

| | | | | | |
|---|---|---|---|---|---|
| 2,362,505 | A * | 11/1944 | Smith | ............... | B23K 9/035 219/160 |
| 2,371,823 | A * | 3/1945 | Jackson | ............... | B23K 9/035 219/137 R |
| 2,416,379 | A * | 2/1947 | Cohn | ............... | B23K 9/035 219/137 R |
| 2,490,024 | A * | 12/1949 | Bernard | ............... | B23K 9/025 219/124.5 |
| 2,916,001 | A * | 12/1959 | Chyle | ............... | B23K 9/035 228/189 |
| 3,135,047 | A * | 6/1964 | Houser | ............... | B23K 9/035 228/216 |
| 3,351,734 | A * | 11/1967 | Arikawa | ............... | B23K 9/035 219/137 R |
| 3,365,566 | A * | 1/1968 | Kuder | ............... | B23K 9/035 219/160 |
| 3,432,915 | A * | 3/1969 | Doyle | ............... | B23K 9/0282 219/160 |
| 3,446,931 | A * | 5/1969 | Yoshio | ............... | B23K 9/035 219/146.52 |
| 3,548,489 | A * | 12/1970 | Katsuro | ............... | B23K 9/035 228/216 |
| 3,575,574 | A * | 4/1971 | Almqvist | ............... | B23K 9/035 219/137 R |
| 3,581,039 | A * | 5/1971 | Kanzaki | ............... | B23K 9/035 219/73 |
| 3,688,080 | A * | 8/1972 | Cartwright | ............... | B23K 9/035 219/137 R |
| 3,922,517 | A * | 11/1975 | Nelson | ............... | B23K 9/0286 219/137 R |
| 3,941,974 | A * | 3/1976 | Kano | ............... | B23K 9/035 219/123 |
| 4,075,453 | A * | 2/1978 | Roberts | ............... | B23K 9/035 219/125.1 |
| 4,125,758 | A * | 11/1978 | Oishi | ............... | B23K 9/0209 219/126 |
| 4,145,598 | A * | 3/1979 | Iio | ............... | B23K 9/0352 219/137 R |
| 4,213,555 | A * | 7/1980 | Minkiewicz | ............... | B23K 9/0286 219/60 A |
| 4,295,593 | A * | 10/1981 | Kensrue | ............... | B23K 9/035 219/160 |
| 4,360,141 | A * | 11/1982 | Kensrue | ............... | B23K 9/035 165/47 |
| 4,891,494 | A * | 1/1990 | Baujat | ............... | B23K 9/0213 219/136 |
| 5,030,812 | A * | 7/1991 | Sugitani | ............... | B23K 9/0216 219/124.34 |
| 5,451,741 | A * | 9/1995 | Doronin | ............... | B23K 9/035 219/160 |
| 6,386,427 | B2 * | 5/2002 | Iwago | ............... | B23K 9/02 219/61 |
| 8,153,935 | B2 * | 4/2012 | Jang | ............... | B23K 35/0266 219/145.22 |
| 9,156,112 | B2 * | 10/2015 | Okazaki | ............... | B23K 9/025 |
| 2009/0173727 | A1 * | 7/2009 | Yun | ............... | B23K 9/0216 219/137 R |
| 2010/0159265 | A1 * | 6/2010 | Fairchild | ............... | B23K 9/0282 428/586 |
| 2010/0206130 | A1 * | 8/2010 | Nako | ............... | B23K 35/0261 75/302 |
| 2011/0108527 | A1 * | 5/2011 | Peters | ............... | B23K 9/09 219/73.2 |
| 2013/0327749 | A1 * | 12/2013 | Denney | ............... | B23K 9/0956 219/137 PS |
| 2015/0117937 | A1 * | 4/2015 | Nakamura | ............... | B23K 35/368 403/272 |
| 2015/0122781 | A1 * | 5/2015 | Albrecht | ............... | B23K 9/0953 219/73 |
| 2015/0283639 | A1 * | 10/2015 | Henry | ............... | B23K 35/3053 219/130.51 |

FOREIGN PATENT DOCUMENTS

CN         103264209         8/2013
EP          2094433         9/2009
JP     WO 2014088111 A1 *     6/2014     ............ B23K 9/173

* cited by examiner

STAINLESS STEEL WELDMENT AND PAD COMBINED WELDING METHOD

CROSS REFERENCE OF RELATED APPLICATION

This is a U.S. National Stage under 35 U.S.C. 371 of the International Application PCT/CN2013/082851, filed Sep. 3, 2013, which claims priority under 35 U.S.C. 119(a-d) to CN 201310149268.7, filed Apr. 26, 2013.

BACKGROUND OF THE PRESENT INVENTION

Field of Invention

The present invention relates to a field of stainless steel welding, and more particularly to a butt-joint welding method for stainless steel facilities or pipes, suitable for forming and welding root passes.

Description of Related Arts

During a process of welding the stainless steel weldment, due to the high content of alloy, the metal in the weld pool has a poor liquidity, which tends to generate various welding defects. Especially for welding the root welding seams of the stainless steel facilities or pipes, without the cleaning treatment, the root welding seams are liable to suffer from the incomplete penetration and the lack of fusion, as well as the oxidation at the backs of the welding seams.

Conventionally, the shielded metal arc welding (SMAW) and the gas tungsten arc welding (GTAW) are capable of solving the oxidation at the backs of the welding seams. However, the SMAW has a difficulty in the formation of the backs of the welding seams; a high current would induces a low weld pool, and be liable to penetrate the weldment or generate an overlap at the back of the welding seam; and a low current would induces a shallow fusion depth, the incomplete penetration and the lack of fusion. Although the GTAW well accomplishes one-side welding with back formation, the back of the welding seam requires the protection from argon, otherwise the welding seam would be oxidized, which reduces the strength of the welding seam and the resistance to corrosion and blackens the appearance. Adopting the GTAW and filling the argon to protect the back of the welding seam both greatly increase the welding cost, especially in the butt-joint welding of the slim pipes, and also greatly affects the heath, the safety and the working environment of the welders.

SUMMARY OF THE PRESENT INVENTION

An object of the present invention is to provide a stainless steel weldment and pad combined welding method which avoids a back oxidation of the conventional GTAW, omits a step of filling argon to protect an inner wall of the weldment to save argon, reduces welding costs and improves a welding operation environment in favor of welders' health.

Accordingly, in order to accomplish the above objects, the present invention provides a stainless steel weldment and pad combined welding method comprising steps of:

(a) respectively processing and pairing butts of to-be-welded portions of two weldments, wherein, during pairing, inner walls of the two weldments are aligned at the same plane; the butts of the two weldments are opposed to form a V-shaped groove with an angle $\alpha$; and between bottoms of the butts of the two weldments is kept a gap L of 2-4 mm;

(b) providing a copper pad at the gap between the bottoms of the butts of the two weldments, wherein the copper pad closely attaches to the inner walls of the two weldments;

(c) welding the V-shaped groove to form a root pass; and (d) removing the copper pad, and filling the root pass to be welded into a cover pass.

The step (c) is in a manner of manual GTAW, comprising steps of: igniting an arc by a nozzle of a welding gun at the butt of the weldment at a first side of the V-shaped groove to generate a weld pool; adding a welding wire to obtain molten drops for fusion with the weldment at the first side; swing the arc of the nozzle of the welding gun to the butt of the weldment at a second side of the V-shaped groove, while rapidly introducing the molten drops which are generated by the welding wire onto the weldment at the second side for fusion with the weldment at the second side; and forming a whole root pass by repeating the swinging between the first side and the second side.

During the step (c), the welding gun forms an angle of 40-50° with a central axis of the V-shaped groove; the arc is right opposed to the butts of the weldmens at the two sides of the V-shaped groove and spaced from the copper pad; the welding wire is provided at the central axis of the V-shaped groove; a welding current is 90-120 A; a welding voltage is 12-15V; a welding speed is 70-90 mm/min; an argon flow rate of the welding gun is 10-16 L/min; a temperature of the two weldments, at the two sides of the V-shaped groove at a distance of 100 mm from the weld pool, and the copper pad is ≤60° C.

The copper pad is provided along a whole welding seam or around a circumference of a whole welding opening. The copper pad is 2 mm thick, 20-30 mm wide, and as long as the welding seam or the welding opening. The copper pad is mounted onto the inner walls of the two weldments by a clipper.

The copper pad is 2 mm thick, 20-30 mm wide, and 100-200 mm long. The copper pad is manually inserted from external sides of the two weldments, through the gap between the bottoms of the butts, into the inner sides of the weldments to closely attach to the inner walls of the two weldments. The copper pad is manually held to synchronously move with the arc.

A breach is provided at a final arc stopping spot of the whole welding seam or the whole welding opening. The breach has a size fit for the copper pad to be taken out.

The root pass has a thickness of 2-3 mm.

Compared with conventional technology, the stainless steel weldment and pad combined welding method of the present invention takes advantage of an inability to be welded and melted with stainless steel of copper, and thus provides the pad made of copper plates or bars at the gap L between the bottoms of the butts of the two weldments. The copper pad closely attaches to the inner walls of the two weldments as a backing for welding the V-shaped groove in the manner of GTAW. The copper pad is capable of sealing up the back of the welding seam so that the welding seam is prevented from being oxidized even without the protection from the argon, so as to save costs, improve a welding operation environment and be favorable for welders' physical health.

Figure 1:
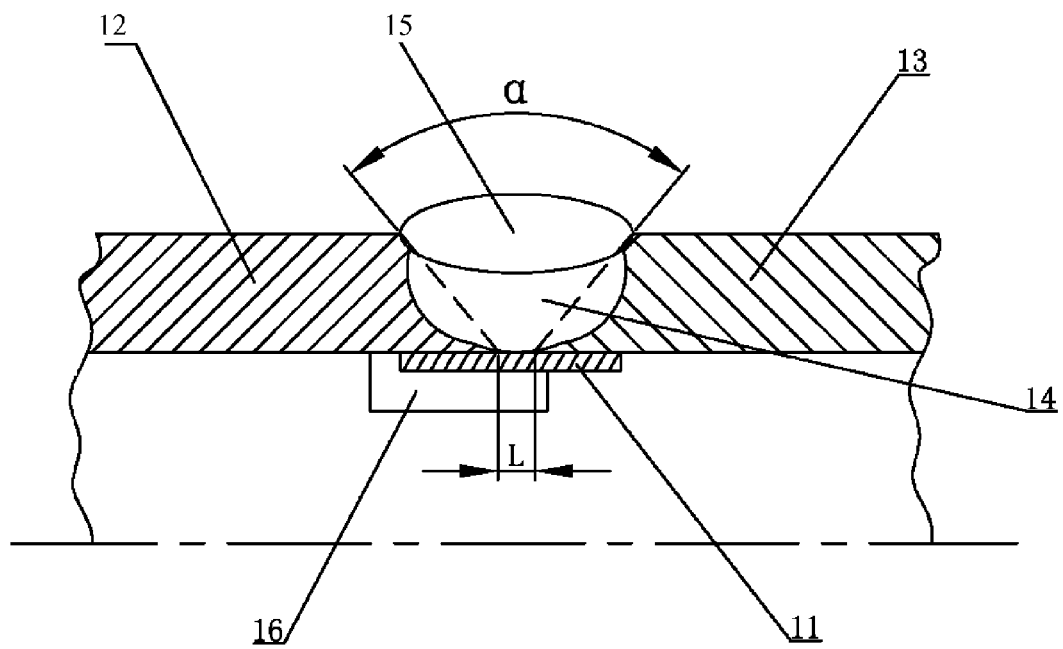
FIG. 1 is a sectional view at a direction vertical to a welding seam of mounting a copper pad of a stainless steel weldment and pad combined welding method according to preferred embodiments of the present invention.

The stainless steel weldment and pad combined welding method of the present invention is further illustrated by the following drawings.

DETAILED DESCRIPTION OF THE PREFERRED EMBODIMENT

First Preferred Embodiment

Base metal of weldment A and weldment B: TP316L, scale ϕ 88.9×5.49 mm

Welding material: welding wire H03Cr19Ni12Mo2Si (YB/T5092-2005), scale ϕ2.4 mm

Copper pad scale: thickness 2 mm, width 20 mm

According to the first preferred embodiment of the present invention, a stainless steel weldment and pad combined welding method comprises steps of:

(a) respectively processing and pairing butts of to-be-welded portions of the weldment A 12 and the weldment B 13, wherein, during pairing, inner walls of the two weldments A and B are aligned at the same plane; the butts of the two weldments A and B are opposed to form a V-shaped groove with an angle α of 60°; and between bottoms of the butts of the two weldments A and B is kept a gap L of 2-4 mm;

(b) providing a copper pad 11 at the gap L between the bottoms of the butts of the two weldments A and B, and closely attaching the copper pad 11 to the inner walls of the two weldments A and B;

(c) welding the V-shaped groove to form a root pass 14 in a manner of manual GTAW which has a welding current of 90 A, a welding voltage of 12V, a welding speed of 70-80 mm/min, an argon flow rate of 10 L/min, and an angle of 40° between a welding gun and a central axis of the V-shaped groove, comprising steps of: igniting an arc by a nozzle of the welding gun at the butt of the weldment A at a first side of the V-shaped groove to generate a weld pool; adding a welding wire to obtain molten drops for fusion with the weldment A; swing the arc of the nozzle of the welding gun to the butt of the weldment B at a second side of the V-shaped groove, and rapidly introducing the molten drops which are generated by the welding wire onto the weldment B for fusion with the weldment B; forming a whole of the root pass 14 having a deposit thickness of 3.0 mm by repeating the swinging between the first side and the second side, wherein a temperature of the two weldments A and B, at the two sides of the V-shaped groove at a distance of 100 mm from the weld pool, and the copper pad is required to be ≤60° C.; and, once the temperature is over 60° C., stops welding, or cooling down with wet clothes or cooling water; and (d) removing the copper pad and filling the root pass 14 to be welded into a cover pass 15.

As showed in FIG. 1, for a welding seam or a welding opening (such as a rotary welding opening) via which it is convenient to remove the copper pad after the step of welding, the copper pad 11 is provided along a whole of the welding seam or a circumference of a whole of the welding opening, and is as long as the welding seam or the welding opening; the copper pad 11 is mounted onto the inner walls of the weldments A and B by a clipper 16.

Figure 2:
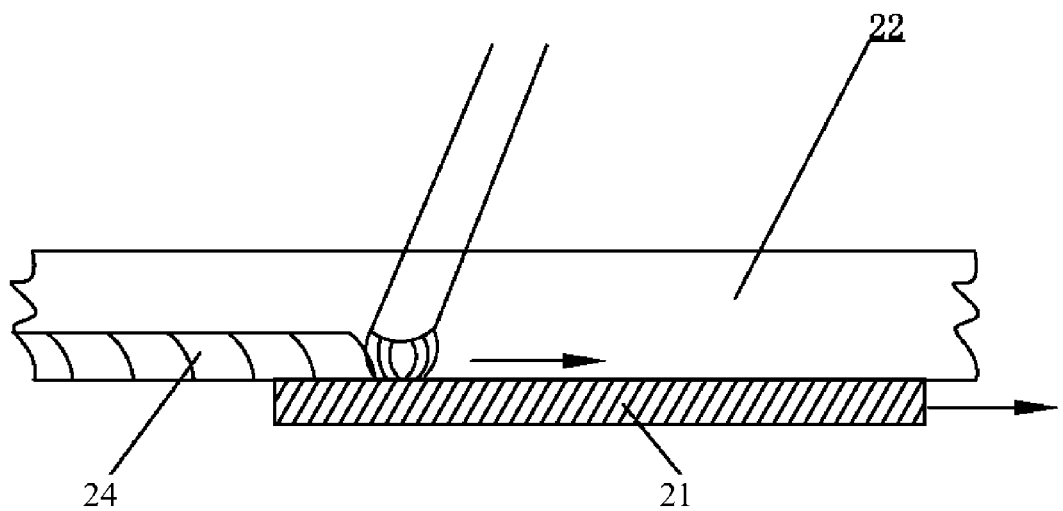
FIG. 2 is a sectional view at a direction along the welding seam of moving a copper pad of the stainless steel weldment and pad combined welding method according to the preferred embodiments of the present invention.

Otherwise as showed in FIG. 2, for a welding seam or a welding opening (such as an on-site fixed welding opening) via which it is inconvenient to remove the copper pad, the copper pad 21 has a length of 100-200 mm. The copper pad 21 is manually inserted from external sides of the weldments A and B, then through the gap L between the bottoms of the butts, and finally into inner sides of the weldments A and B, and maintains closely attached to the inner walls of the weldment A 22 and the weldment B (unshown in FIG. 2). When a first welder is welding inside the V-shaped groove which has a backing of the copper pad 21, the welding arc keeps moving forward with the formation of the root pass 24; the copper pad 21 is hand-held by a second welder to synchronously move forward, and stops near a final arc stopping spot of the welding seam or the welding opening, leaving a breach whose size allows taking the copper pad 21 out. The copper pad 21 is taken out via the breach; then the breach is processed with a seal welding in a manner of SMAW or in the manner of GTAW with a backing welding wire specialized for preventing an oxidation of the back of the welding seam, so as to completely finish the root pass of the whole of the welding seam.

After tests, the finished welding seam is good in each aspect.

Appearance Checking: inner surface and outer surface of the welding seam are well formed; no oxidation phenomenon and no defects including bubbles, cracks and incomplete penetration are perceived in the root pass; the copper pad is easily removed and has a smooth and flat surface, and no melting is perceived.

X Ray Test: the film is rated as grade II of JB4730-2005 standard of China; no defects of cracks, incomplete penetration or lack of fusion are perceived; the welding seam is internally qualified.

Welding Joint Performance Test:

tension test: ductile-base metal, having an anti-tensile strength of 620 MPa, is larger than a lower threshold of the base metal standard;

bend test: the specimen is bent at an angle of 180° with a bend diameter of 4 times of the base metal thickness, no cracks perceived, and thus passes the bend test;

root pass inter-granular corrosion test: after a sulfuric acid-copper sulfate corrosion test, bent at an angle of 180°, amplified 10×, no inter-granular corrosion tendency is perceived;

root pass copper content test: copper contents are respectively 0.55%, 0.40% and 0.60%, all no larger than 0.75%, which proves that, during welding, the copper pad basically do not melt or penetrate into the welding seam;

root pass metallographic test: a metallographic organization is Austenite+5.6% of ferrite;

root pass hardness test: Brinell Hardness Values of 150HB, 155HB and 165HB.

Second Preferred Embodiment

Base metal of weldment A and weldment B: 0Cr18Ni9, scale ϕ159×6 mm

Welding material: welding wire H08Cr21Ni10Si(YB/T5092-2005), scale ϕ2.5 mm

Copper pad scale: thickness 2 mm, width 25 mm

The stainless steel weldment and pad combined welding method of the second preferred embodiment is different from the first preferred embodiment in the step of welding to form the root pass in the manner of manual GTAW which has a welding current of 105 A, a welding voltage of 15V, a welding speed of 75-85 mm/min, an argon flow rate of 13 L/min, and an angle of 45° between a welding gun and a central axis of the V-shaped groove, wherein the root pass has a deposit thickness of 2.5 mm.

After tests, the finished welding seam is good in each aspect.

Appearance Checking: inner surface and outer surface of the welding seam are well formed; no oxidation phenomenon and no defects including bubbles, cracks and incomplete penetration are perceived in the root pass; the copper pad is easily removed and has a smooth and flat surface, and no melting is perceived.

X Ray Test: the film is rated as grade II of JB4730-2005 standard of China; no defects of cracks, incomplete penetration or lack of fusion are perceived; the welding seam is internally qualified.

Welding Joint Performance Test:
 tension test: ductile-base metal, having an anti-tensile strength of 640 MPa, is larger than a lower threshold of the base metal standard;
 bend test: the specimen is bent at an angle of 180° with a bend diameter of 4 times of the base metal thickness, no cracks perceived, and thus passes the bend test;
 welding seam −196° C. low temperature impact test: tested welding seam impact values are respectively 36 $J/cm^2$, 28 $J/cm^2$ and 30 $J/cm^2$; and hot affect zone impact values are respectively 70 $J/cm^2$, 38 $J/cm^2$ and 44 $J/cm^2$;
 root pass inter-granular corrosion test: after a sulfuric acid-copper sulfate corrosion test, bent at an angle of 180°, amplified 10×, no inter-granular corrosion tendency is perceived;
 root pass copper content test: copper contents are respectively 0.35%, 0.45% and 0.50%, all no larger than 0.75%, which proves that, during welding, the copper pad basically do not melt or penetrate into the welding seam;
 root pass metallographic test: a metallographic organization is Austenite+5.0% of ferrite;
 root pass hardness test: Brinell Hardness Values of 156HB, 162HB and 170HB.

Third Preferred Embodiment

Base metal of weldment A and weldment B: 00Cr19Ni10, scale φ 159×6 mm

Welding material: welding wire H00Cr21Ni10(YB/T5092-2005), scale φ2.5 mm

Copper pad scale: thickness 2 mm, width 30 mm

The stainless steel weldment and pad combined welding method of the third preferred embodiment is different from the first preferred embodiment in the step of welding to form the root pass in the manner of manual GTAW which has a welding current of 120 A, a welding voltage of 15V, a welding speed of 80-90 mm/min, an argon flow rate of 16 L/min, and an angle of 50° between a welding gun and a central axis of the V-shaped groove, wherein the root pass has a deposit thickness of 2.0 mm.

After tests, the finished welding seam is good in each aspect.

Appearance Checking: inner surface and outer surface of the welding seam are well formed; no oxidation phenomenon and no defects including bubbles, cracks and incomplete penetration are perceived in the root pass; the copper pad is easily removed and has a smooth and flat surface, and no melting is perceived.

X Ray Test: the film is rated as grade II of JB4730-2005 standard of China; no defects of cracks, incomplete penetration or lack of fusion are perceived; the welding seam is internally qualified.

Welding Joint Performance Test:
 tension test: ductile-base metal, having an anti-tensile strength of 630 MPa, is larger than a lower threshold of the base metal standard;
 bend test: the specimen is bent at an angle of 180° with a bend diameter of 4 times of the base metal thickness, no cracks perceived, and thus passes the bend test;
 root pass inter-granular corrosion test: after a sulfuric acid-copper sulfate corrosion test, bent at an angle of 180°, amplified 10×, no inter-granular corrosion tendency is perceived;
 root pass copper content test: copper contents are respectively 0.50%, 0.45% and 0.60%, all no larger than 0.75%, which proves that, during welding, the copper pad basically do not melt or penetrate into the welding seam;
 root pass metallographic test: a metallographic organization is Austenite+6.0% of ferrite;
 root pass hardness test: Brinell Hardness Values of 172HB, 155HB and 179HB.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

INDUSTRIAL APPLICABILITY

The stainless steel weldment and pad combined welding method of the present invention, for a butt-joint welding of stainless steel devices or pipes, is suitable for formation and welding of root passes, and able to overcome a difficulty in a root formation of a stainless steel welding seam and reduces defects of incomplete penetration and lack of fusion, so as to avoid a back oxidation of the conventional GTAW, omit the step of filling argon to protect inner walls of the weldment, save argon, reduce welding costs, improve a welding operation environment and be favorable to welders' physical health.

What is claimed is:

1. A stainless steel weldment and pad combined welding method, comprising steps of:
 (a) respectively processing and pairing butts of to-be-welded portions of two weldments, wherein, during pairing, inner walls of the two weldments are aligned at the same plane; the butts of the two weldments are opposed to form a V-shaped groove with an angle α; and between bottoms of the butts of the two weldments is kept a gap L of 2-4 mm;
 (b) providing a copper pad at the gap between the bottoms of the butts of the two weldments, wherein the copper pad closely attaches to the inner walls of the two weldments;
 (c) welding the V-shaped groove to form a root pass; and
 (d) removing the copper pad, and filling the root pass to be welded into a cover pass, wherein the copper pad is 2 mm thick, 20-30 mm wide, and 100-200 mm long; the copper pad is manually inserted from external sides of the two weldments, through the gap between the bottoms of the butts, into the inner sides of the weldments to closely attach to the inner walls of the two weldments; and the copper pad is manually held to synchronously move with an arc.

2. The stainless steel weldment and pad combined welding method, as recited in claim 1, wherein a breach is provided at a final arc stopping spot of the whole welding seam or the whole welding opening; and the breach has a size fit for the copper pad to be taken out.

3. The stainless steel weldment and pad combined welding method, as recited in claim 1, wherein the angle α formed by the butts of the two weldments is 60°.

4. The stainless steel weldment and pad combined welding method, as recited in claim 2, wherein the angle α formed by the butts of the two weldments is 60°.

5. The stainless steel weldment and pad combined welding method, as recited in claim 1, wherein the root pass has a thickness of 2-3 mm.

6. The stainless steel weldment and pad combined welding method, as recited in claim 2, wherein the root pass has a thickness of 2-3 mm.

7. The stainless steel weldment and pad combined welding method, as recited in claim 4, wherein the root pass has a thickness of 2-3 mm.

8. The stainless steel weldment and pad combined welding method, as recited in claim 3, wherein the step (c) is executed in a manner of manual gas tungsten arc welding, comprising steps of: igniting an arc by a nozzle of a welding gun at the butt of the weldment at a first side of the V-shaped groove to generate a weld pool; adding a welding wire to obtain molten drops for fusion with the weldment at the first side; swing the arc of the nozzle of the welding gun to the butt of the weldment at a second side of the V-shaped groove, while rapidly introducing the molten drops which are generated by the welding wire onto the weldment at the second side for fusion with the weldment at the second side; and forming a whole root pass by repeating the swinging between the first side and the second side.

9. The stainless steel weldment and pad combined welding method, as recited in claim 1, wherein during welding, the welding gun forms an angle of 40-50° with a central axis of the V-shaped groove; the arc is right opposed to the butts of the weldments at the two sides of the V-shaped groove and spaced from the copper pad; the welding wire is provided at the central axis of the V-shaped groove; a welding current is 90-120 A; a welding voltage is 12-15V; a welding speed is 70-90 mm/min; an argon flow rate of the welding gun is 10-16 L/min.

\* \* \* \* \*